H. DODEL.
OIL HEATER.
APPLICATION FILED APR. 3, 1908.

906,781.

Patented Dec. 15, 1908.

Witnesses:
F. E. Maynard,
Charles A. Penfield

Inventor:
Hans Dodel;
By Geo. H. Strong
Atty.

UNITED STATES PATENT OFFICE.

HANS DODEL, OF SAN FRANCISCO, CALIFORNIA.

OIL-HEATER.

No. 906,781.　　　Specification of Letters Patent.　　　Patented Dec. 15, 1908.

Application filed April 3, 1908. Serial No. 424,870.

*To all whom it may concern:*

Be it known that I, HANS DODEL, citizen of the United States, residing in the city and county of San Francisco and State of California, have invented new and useful Improvements in Oil-Heaters, of which the following is a specification.

My invention relates to oilers, and oil heating appliances, and pertains especially to oil tanks for use with automobile and other engines, and to a means for heating the oil whereby it will flow more freely and lubricate more efficaciously.

The invention consists of the parts and the construction and combination of parts as hereinafter more fully described and claimed, having reference to the accompanying drawings, in which—

Figure 1:
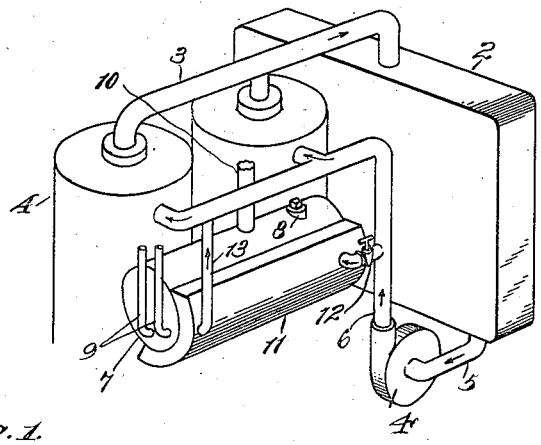
Figure 2:
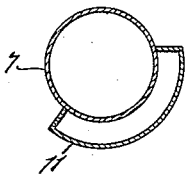

Figure 1 is a perspective view of the device as applied. Fig. 2 is a transverse section through the cylinder.

In the embodiment of this invention in actual practice, I have shown it in conjunction with the engine and radiator of an automobile; but it will be manifest that the invention is not limited to any specific use or any specific location.

A represents a gas engine of well known construction, 2 a radiator, 3 a pipe leading from the jacket of the engine or engines to the radiator, and 4 a centrifugal pump for circulating the cooling fluid from the radiator back through the pipes 5—6 to the engine jacket.

7 is an oil tank having a suitably plugged oil inlet 8, and one or more oil outlets, as 9, through which the oil is led to the various parts and mechanism of the machine needing lubrication. The flow of the oil from the tank through the discharge conduits 9 is accomplished in the present case by the admission of compressed air derived from any suitable source of supply through the pipe 10 leading into the oil tank; the compressed air exerting a suitable pressure on the oil to effect its proper flow and discharge.

The invention comprehends a water jacket, as 11, contiguous to the oil tank, and having suitable fluid connections, as represented at 12—13, for the water circulation of the radiator and cooling system.

After the engine is started, the water in the radiator becomes heated, so that if this water is brought into contact with the walls of the oil tank, the heat from the water will be imparted to the oil and increase the fluidity of the latter, which is the main desideratum of the invention. The water, as it comes from the engine and enters the radiator, is practically in a boiling condition, and it still retains sufficient heat, when returned through the pump and circulated through the water jacket 11, to heat up the oil.

While I have shown a cylindrical oil tank, it is manifest that the oil tank and the cooling water jacket may be of any suitable size, shape or material.

It is immaterial how the water jacket is fastened to the oil tank. It is preferred, however, that the water jacket be of such size and shape that a considerable body of oil in the tank will be exposed through the intervening wall to a large heating area of water in the water jacket. Therefore, in using a cylindrical oil tank, as 7, I prefer to use a segmental water jacket, as 11, partially surrounding the oil tank, and therefore increasing the heated oil surface.

In operation, the engine is started, whereupon the pump 4 causes a circulation through the system in the direction of the arrows, part of the return water to the cylinders being by-passed through the connections 12—13 to the water jacket, thus maintaining a constantly heated volume of water in the water jacket.

Among the numerous advantages of heating the lubricating oil is that the flow of warm or heated oil is easier and more regular than the flow of cold oil. Therefore, a less quantity of oil is necessary; and also, it has been found that in oiling the cylinders there is less liability of fouling the spark plugs. Heating the oil enables a thicker lubricant to be used. The warm oil enters all grooves more freely, thereby oiling the machine better, preserving its parts, and lessening friction. It also permits the valves of the engine to close more tightly, thereby increasing its power.

Having thus described my invention, what I claim and desire to secure by Letters Patent is—

1. The combination of an oil tank, a water cooling system, a water jacket partially inclosing the oil tank, and by-pass connections between the circulating pipes of the water cooling system and the water jacket adapted to transmit heat to the oil in said tank.

2. The combination of an oil tank, a water jacket partially inclosing the same, a water cooling system having main circulating pipes, and branch pipes connecting the said circulating pipes with the water jacket and diverting a portion of the heated water therethrough, for heating said oil tank.

In testimony whereof I have hereunto set my hand in presence of two subscribing witnesses.

HANS DODEL.

Witnesses:
 XAVIER DODEL,
 H. S. YOUNG.